E. P. NICHOLS.
LEATHER EVENING AND GRADING MACHINE.
APPLICATION FILED DEC. 3, 1914.
1,281,639.
Patented Oct. 15, 1918.
7 SHEETS—SHEET 5.
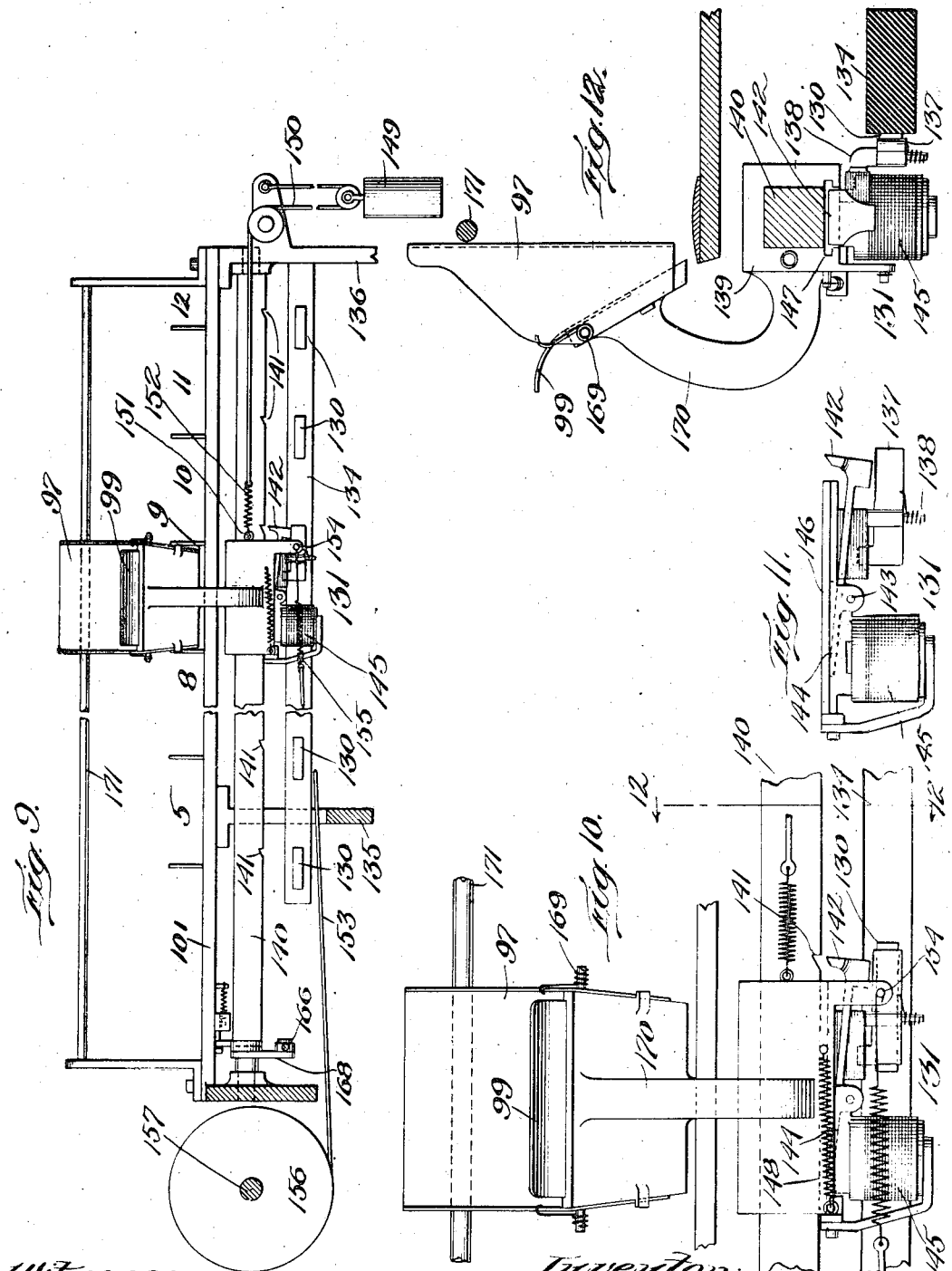
Witnesses:
Arthur F. Randall
James R. Hodder
Inventor:
Elmer P. Nichols,
by Geo. W. Maxwell,
Atty.

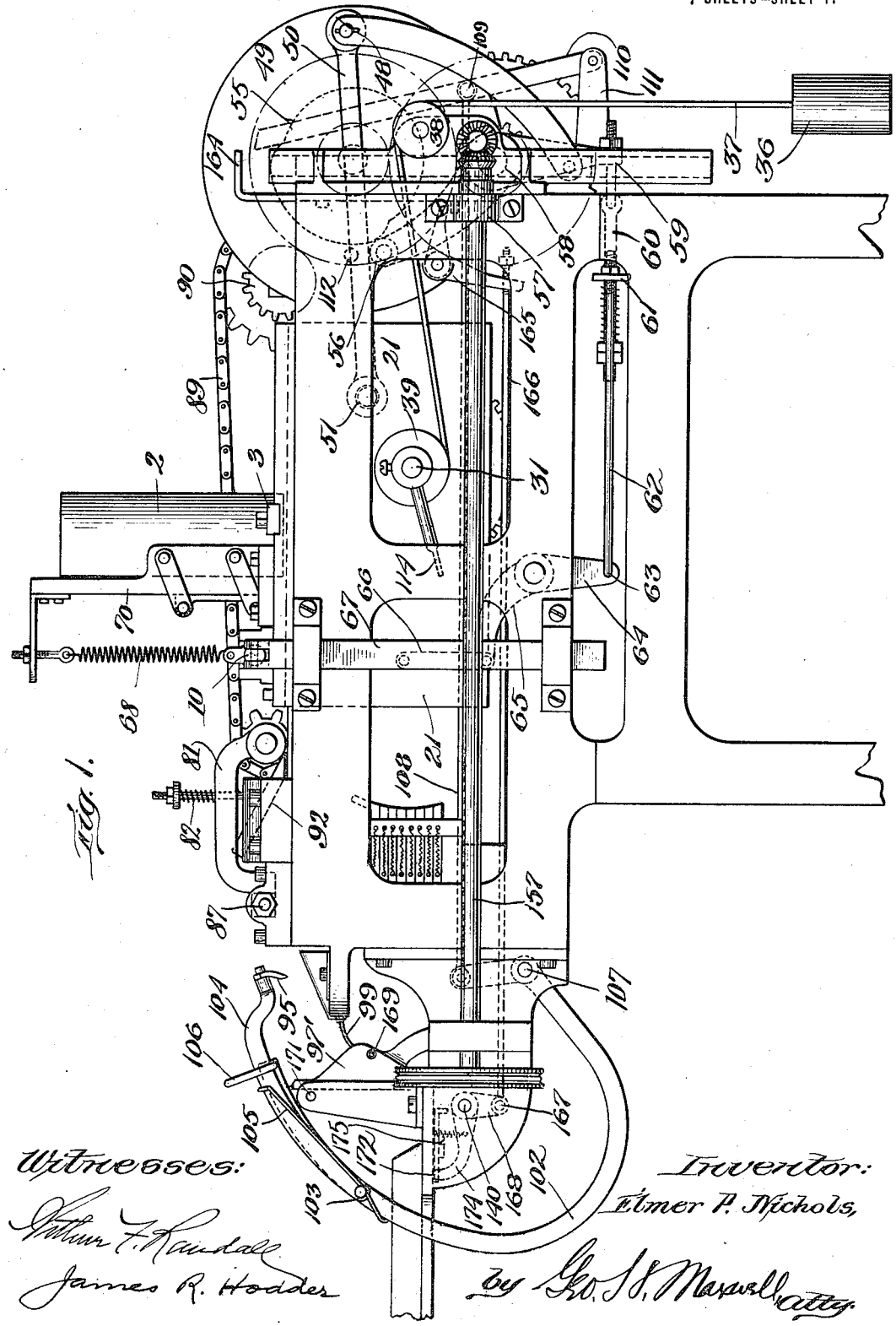

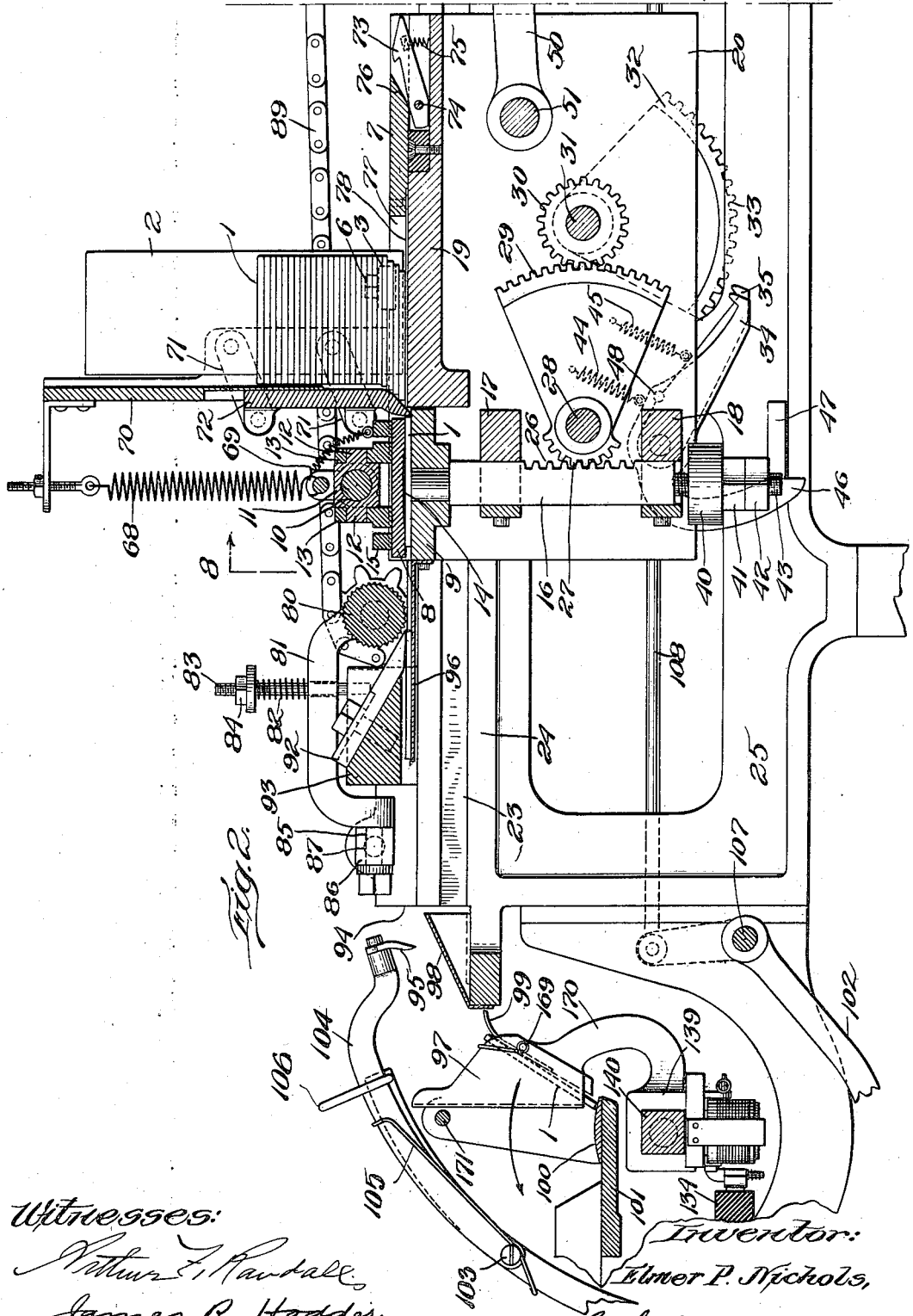

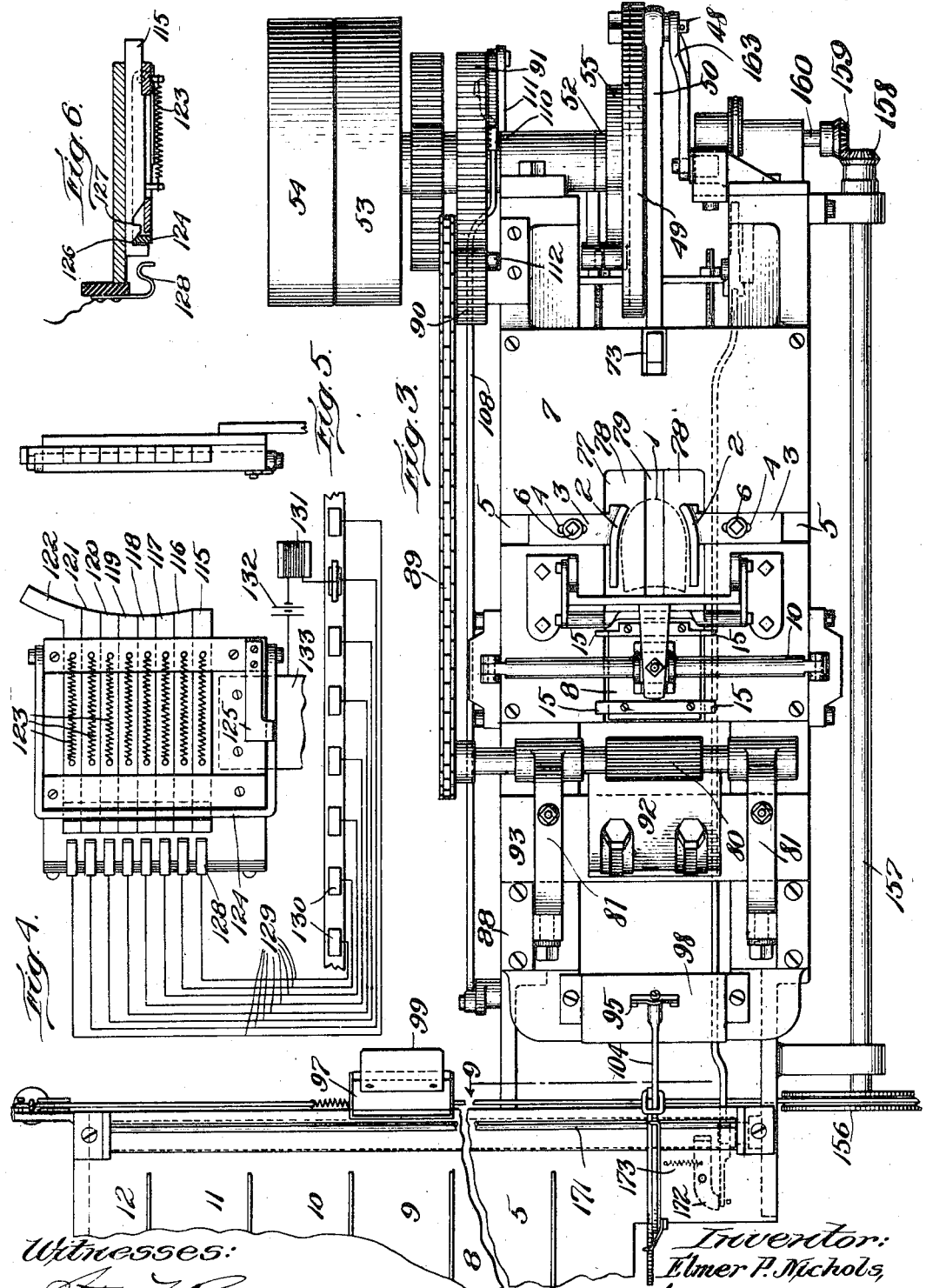

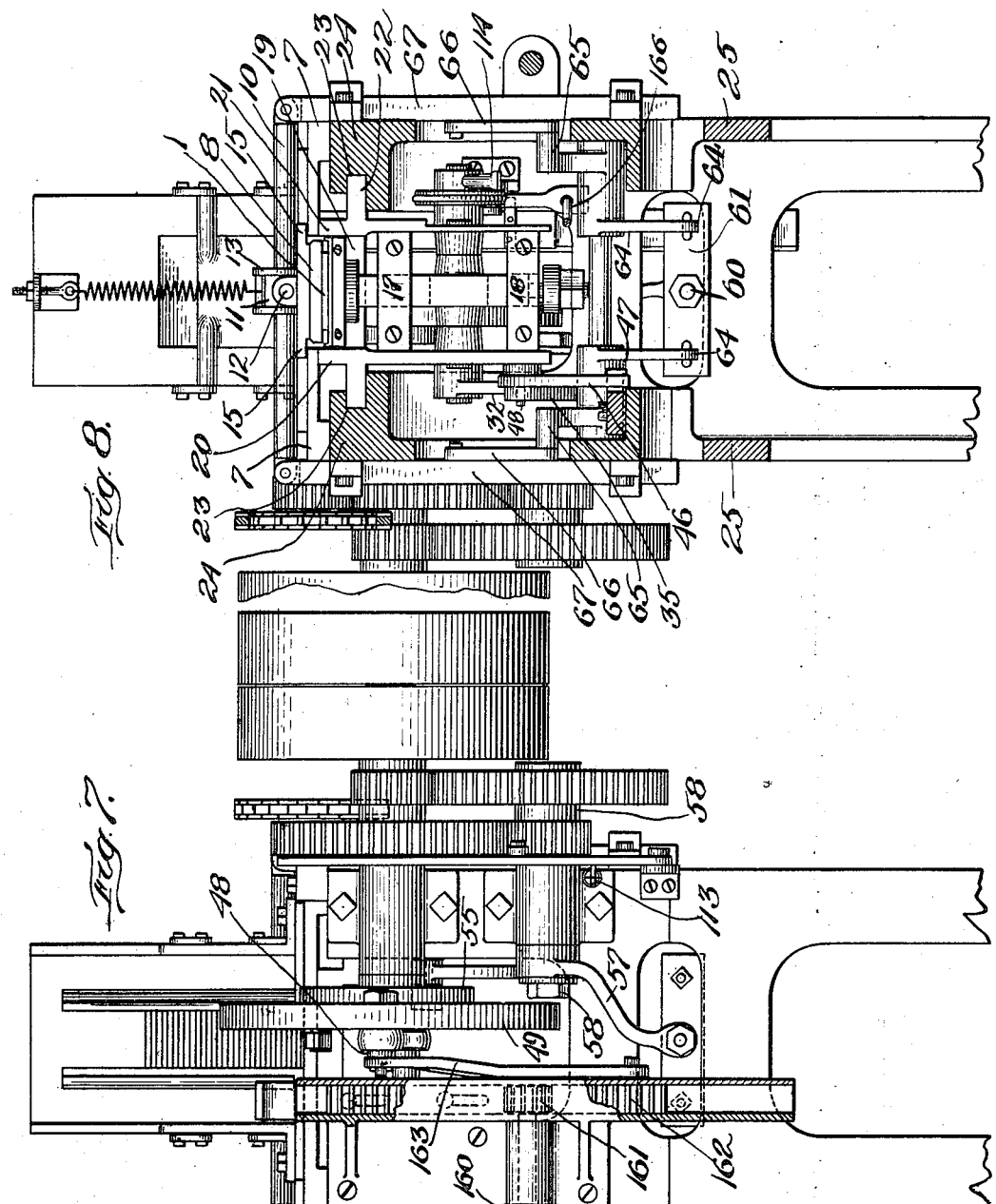

E. P. NICHOLS.
LEATHER EVENING AND GRADING MACHINE.
APPLICATION FILED DEC. 3, 1914.

1,281,639.

Patented Oct. 15, 1918.
7 SHEETS—SHEET 6.

Witnesses:
Arthur E. Randall
James R. Hodder

Inventor:
Elmer P. Nichols,
by Geo. H. Maxwell
Atty.

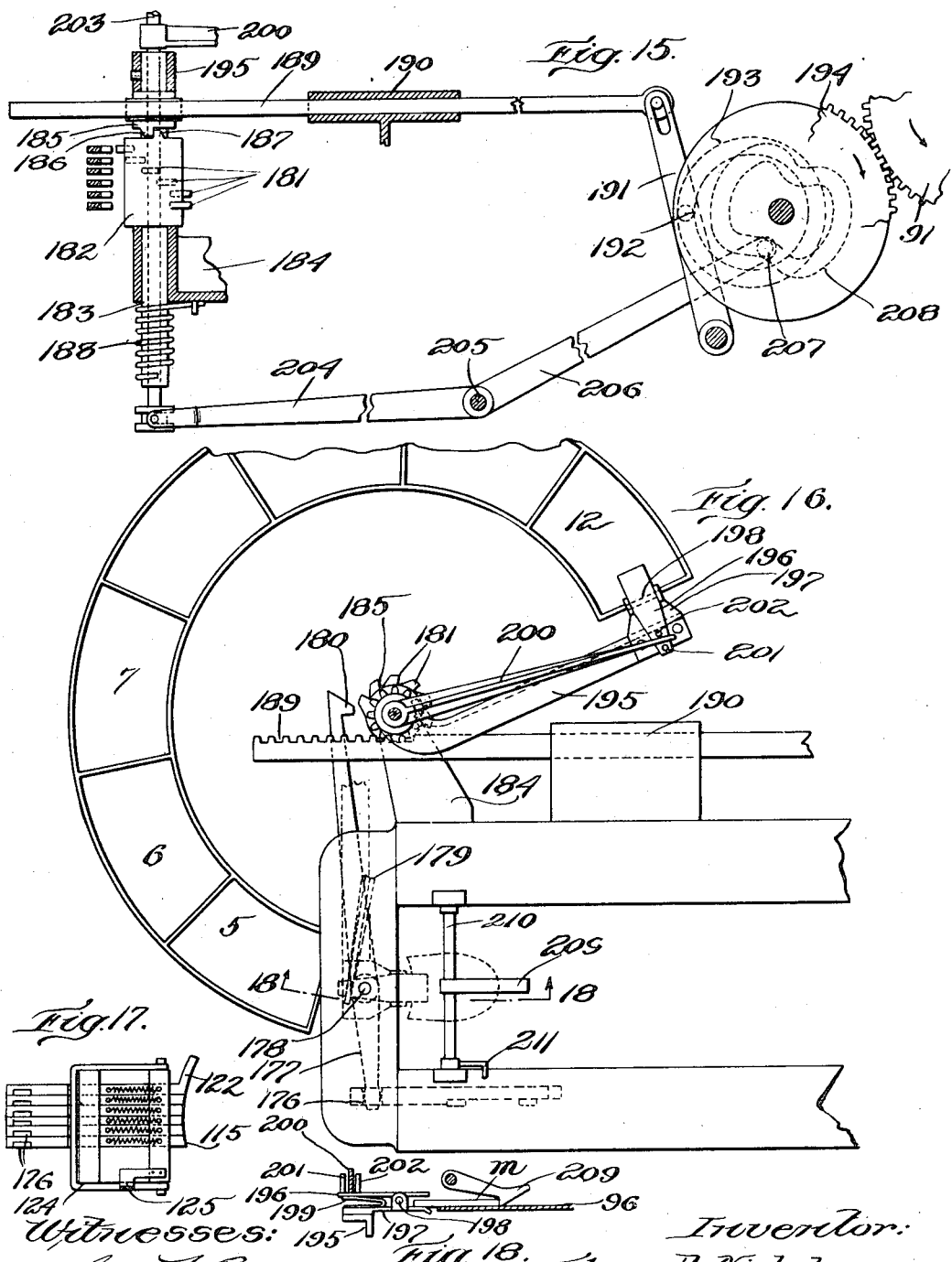

UNITED STATES PATENT OFFICE.

ELMER P. NICHOLS, OF MANCHESTER, NEW HAMPSHIRE, ASSIGNOR TO LACENE MANUFACTURING COMPANY, OF MANCHESTER, NEW HAMPSHIRE, A CORPORATION OF MAINE.

LEATHER EVENING AND GRADING MACHINE.

1,281,639.  Specification of Letters Patent.  Patented Oct. 15, 1918.

Application filed December 3, 1914. Serial No. 875,377.

*To all whom it may concern:*

Be it known that I, ELMER P. NICHOLS, a citizen of the United States, and resident of Manchester, county of Hillsborough, State of New Hampshire, have invented an Improvement in Leather Evening and Grading Machines, of which the following description, in connection with the accompanying drawings, is a specification, like letters on the drawings representing like parts.

My invention is a machine for evening and grading died-out pieces of leather such as heel lifts, counters, taps, soles, etc., being an improvement on the general type of machines disclosed in my patents: Reis. No. 12,288; 841,809; 1,009,988; 1,046,213; 1,057,358; 1,104,378; 1,113,472. While my present machine is herein shown as particularly arranged for handling heel lifts and is specially adapted to such small pieces, the invention in its main features is applicable to all kinds of died-out pieces of stock which are ordinarily required to be graded. The grading mechanism is herein shown as consisting of cutting mechanism and distributing mechanism, both of which are controlled by feeler mechanism or thickness-detecting mechanism. One of the objects of my present machine is to classify or usefully perpetuate the determinations of the feeler means by cutting off the surface of the leather piece or reducing it to an even thickness, and also by further making available the result of the feeler detecting operation by distributing the successive pieces according to their grade or thickness, but without actually marking the leather. In my previous patents above, I have provided (in addition to the evening or cutting mechanism shown in all but the last of the above listed patents) leather engaging means or grading mechanism for marking the leather piece with a readable symbol. But in the case of certain kinds of pieces and of stock it is desirable that the leather should not be marked although it must be graded in some practicable way. For instance, in heel top-lifts such usual marking would tend permanently to disfigure the top-lift, because the leather is usually so thin that the die impression could not be buffed out. Accordingly, besides grading by means of cutting, my present machine classifies or grades by distributing the leather pieces after they are cut and in accordance with their cutting. A further object of my invention is to provide a machine capable of handling the leather pieces at relatively high speed so as to give a large output at minimum cost. Among the more important features of novelty may be mentioned the provision of a detecting mechanism in which all the detecting operations are accomplished by a single feeler, or work member, or pressure plate, or feeler-foot, *i. e.*, by a unitary device which engages the desired area of the leather piece in such a manner and in such coöperation with the rest of the mechanism as to detect, as desired, the thinnest spot in said area; also, a single transmitter for transmitting the determination of the feeler mechanism, distinguished from requiring a plurality of posts, levers, or other transmitting devices as heretofore required; also, mechanism rendering it practicable to cut *i. e.* shave, split, or skive the leather pieces with a knife having a single bevel without the danger of gouging the leather piece; the provision of combining the gaging or adjusting mechanism with the feeding mechanism so that the leather piece is presented bodily to the cutting knife at the right level with minimum liability of distortion. This last mentioned feature avoids the tendency of the previous feed rolls to stretch or spread the leather. And in explanation of the cutting knife feature just mentioned, it has long been considered desirable to employ a knife beveled on one side only, but this has been impossible because such a knife in the cutting machines heretofore provided has always tended to gouge the leather, *i. e.*, to dig into or cut into the leather beyond the extent desired. I have discovered that this tendency was due to the work feeding mechanism and this feature of my invention therefore resides in providing a work feeding mechanism and knife arrangement which eliminates this gouging or digging-in tendency. A further feature of my invention relates to adapting my machine especially to deliver the leather pieces, top-lifts for example, in stacked arrangement or flat against each other in columns as required for use in certain types of machines in which they are subsequently used. For instance, one top-lift compressor requires that the top-lift shall be placed in the machine in columns or stacks, and my machine is specially arranged to stack the top-lifts thus as they are delivered by the distributer.

Further constructional features and resulting advantages will be more apparent in the course of the following description taken in connection with the accompanying drawings in which I have shown preferred embodiments of my invention.

In the drawings,

Figure 1 is a view in side elevation showing the complete machine, parts being broken away for convenience of illustration;

Fig. 2 is a central, vertical, longitudinal section, partly broken away;

Fig. 3 is a broken top plan view thereof;

Fig. 4 is an enlarged detail in side elevation, and diagram of a portion of the distributing mechanism;

Fig. 5 is a fragmentary end view of a portion of the mechanism shown in Fig. 4, looking from the right hand end;

Fig. 6 is a horizontal sectional view through a portion of the mechanism shown in Fig. 4, showing a portion of one of the selectors;

Fig. 7 is a right hand end elevation of the machine as seen in Fig. 1, parts being broken away for clearness of illustration;

Fig. 8 is a transverse vertical section on the line 8, Fig. 2;

Fig. 9 is a fragmentary cross-sectional view on the line 9, Fig. 3, showing in side elevation the receiver for the cut pieces;

Fig. 10 is an enlarged fragmentary detail in side elevation of portions of the mechanism as shown in Fig. 9;

Fig. 11 shows one form of the electrical stop or detent viewed the same as in Fig. 10, but separated from the adjacent mechanism;

Fig. 12 is a transverse vertical section taken on the line 12—12, Fig. 10;

Figure 13:
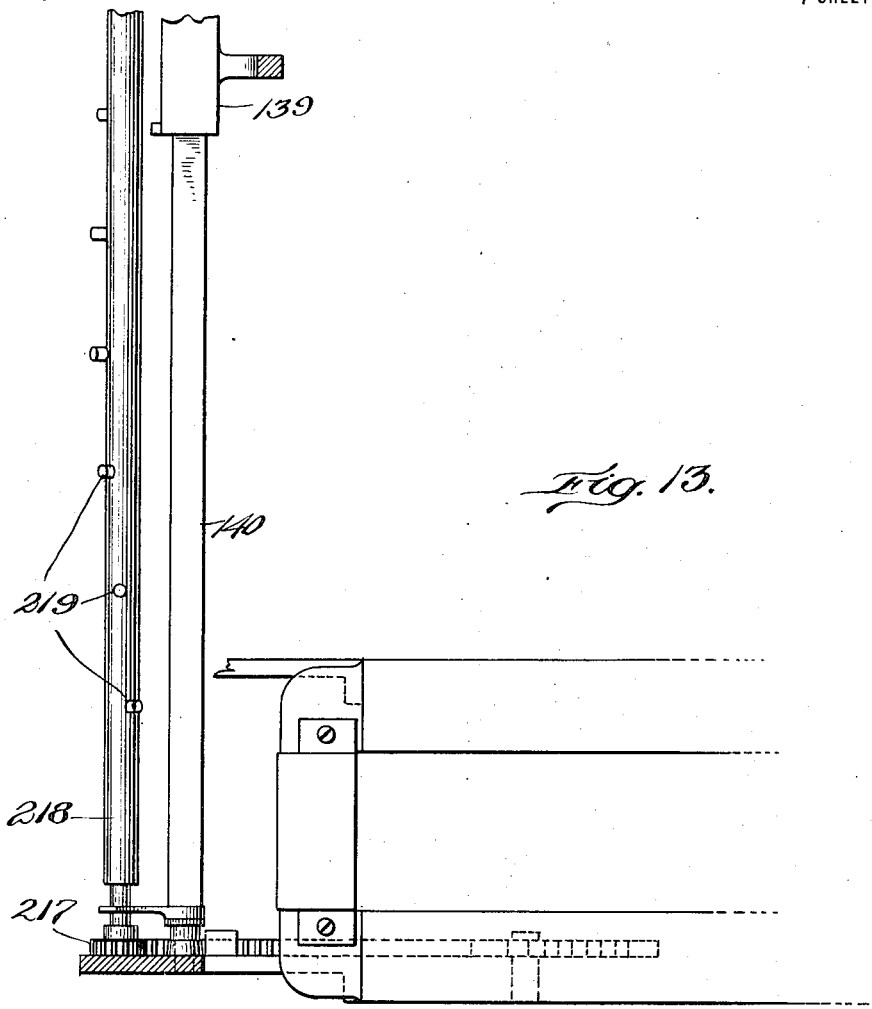
Figure 14:
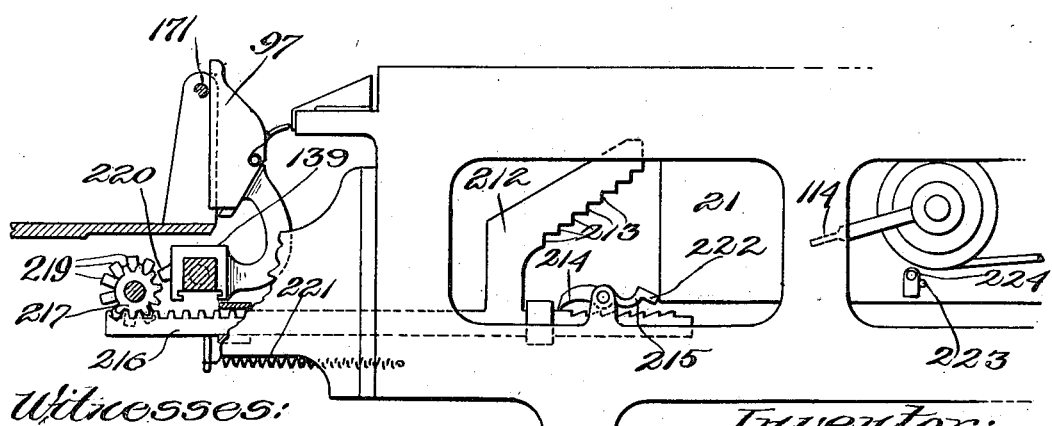

Fig. 13 and Fig. 14 are views in horizontal section and vertical section respectively, of a modified form of the general type of distributing mechanism shown in Figs. 1–3, 9–12, excepting that it implies mechanical instead of electrical selective means; and Figs. 15–18 show a still further species of mechanical distributer, Fig. 15 being a fragmentary view in side elevation, partly broken away and sectioned for clearness of illustration, Fig. 16 a fragmentary top plan view, Fig. 17 a detail of the selector in front elevation, and Fig. 18 is a vertical sectional detail on the line 18, Fig. 16.

As a convenient means of describing my invention so that it will be clearly and readily understood, let it be supposed that it is built for handling heel lifts, i. e., the died-out layers of leather which go to make up a heel, said lifts being shown at 1 in stack formation in a magazine whose opposite curved sides 2 are provided with rigid ears or bottom guides 3 slotted at 4 for adjustment in ways 5 by means of bolts 6 in the table or machine top 7, the outline or shape of said heel lifts being shown in Fig. 3. The lifts 1 may be fed from either end of the stack, being herein shown as fed from the bottom, one at a time. Just in front of the bottom of the stack is a plate 8 beneath which the top lift is fed above a transmission and carrier plate or block 9. The upper plate constitutes a pressure plate, feeler-foot, or work member, for engaging the leather piece to detect the thinnest edge-portion thereof, the present machine being designed for grading with reference to the edge of the stock, and to permit the required detecting movement of said plate 8 it is herein shown as being capable of a swivel or universal movement on its supporting and actuating bar 10. For convenience the universal joint is herein shown as consisting of a central journal block 11 whose opposite gudgeons 12 are pivoted in ears 13 extending rigidly upward from the plate 8. In order that the plate 8 may have proper delicacy of edge detection on the leather and not be controlled by the exterior of the thickest portion of the leather, I have hollowed the underside of the plate 8 as indicated at 14. And to limit the minimum thinness of edge detection I provide corner stops 15 one of whose projecting ends engages the table 7 as the plate tilts in one or another direction at that side or portion which is in engagement with the thinnest edge-portion of the leather piece or heel lift 1. The plate 8 is positively moved downward to an unvarying extent, i. e., the bar 10 which carries it has an unvarying downward movement so that it always stops at one and the same point, and the feeling variation is accomplished by the wabbling or tilting capacity given to the plate 8, as already described, taken in connection with the yielding capacity of the transmission and carrier plate or block 9. This block 9 is freely movable up and down, but always maintained level by a transmission post 16 on whose upper end it is rigidly mounted and which is guided in heavy cross members or bracing beams 17, 18 of the work carriage. This work carriage consists of a top 19 and side members 20, 21 (joined by the members 17, 18), which side members have heavy lateral guide flanges 22, see Fig. 8, which travel in corresponding grooves or ways 23 formed in the relatively heavy upper ends 24 of the side members 25 of the main frame of the machine. The transmission post 16 has teeth 26 on one edge to constitute a rack bar meshing with a correspondingly toothed sector 27 loose on a shaft 28 and provided at its opposite end with a toothed sector 29 meshing with a pinion 30 fast on a shaft 31 which carries at its outer end a setting wheel or locking member 32 provided with notches or teeth 33 adapted to be engaged by a pawl or pawls 34, 35, a plurality of said pawls being herein shown for convenience in order to avoid the necessity otherwise of making the teeth 33 impracticably fine. The transmission plate or block 9 is always given a strong upward pressure or resistance to the downward detecting movement of the feeler plate 8 by any suitable means, the particular means herein shown consisting of a weight 36, Fig. 1, whose suspending cord 37 passes over a pulley 38 to a sheave or disk 39 fast on the shaft 31, and said transmission plate or block is permitted limited upward movement by a stop or bearing collar or washer 40 and nuts 41, 42 on a threaded stud 43 extending from the lower end of the post 16, said collar 40 being arranged to strike against the cross member 18 of the carriage whenever there is no leather piece in position to hold said parts downward. This adjustable stop mechanism also permits the transmission plate or block 9 to be so adjusted that very thin leather pieces will not be cut. The pawls 34, 35 are normally held by springs 44, 45 respectively, under tendency to engage and lock the setting wheel or locking member 32, and one or the other of them is always thus in locking engagement, excepting when the feeler plate 8 is being moved downward in the feeling operation. At this time the carriage has been moved to the right into the position shown in Fig. 2, at which time the tail piece 46 of the pawl 34 strikes a lug 47, see Figs. 2 and 8, which lowers the pawl 34, and at the same time by means of a pin 48 lowers the pawl 35, said pin projecting over said pawl in position to accomplish this movement. Thus when the feeling operation is being effected by the lowering of the feeler plate 8, the intermeshing and connected parts 26, 27, 29, 30, 31 and 32 are free to move in response to the downward pressure of the feeler plate 8. All these parts remain held in their adjusted position by said downward pressure of the feeler plate 8 as the carriage and all of said parts begin their forward feeding movement, but the moment they have been moved forward slightly, the springs 44, 45 bring one or the other of the pawls 34, 35 into locking engagement with the locking teeth 33 of the locking wheel 32, the forward movement of the carriage causing said pawls to swing on their pivot by reason of the forward movement of the tail piece 46 with reference to the lug 47. As herein constructed, the leather piece 1 slides on the plate 8, but as this movement is very slight, in practice only about 1/8″, I have not provided means for avoiding said sliding action in this machine. The feeding movement is a simple, steady, back and forth or crank movement, and is herein shown as accomplished by a wrist pin or crank 48 projecting from the face of a face plate or wheel 49 and connected by a connecting link 50 to the carriage at 51, power being derived through a drive shaft 52 carrying fast and loose pulleys 53, 54. On the inner face of the wheel 49 is a cam 55, Fig. 1, against whose periphery the roll 56 of a bell crank lever 57 travels, said lever being pivoted on a stub shaft 58 intermediate its length and connected at its free end 59 to an eye-bolt 60 extending from a bar 61, see also Fig. 8, from whose opposite ends extend rods 62 pivoted at 63 in the lower end 64 of offset levers whose upper ends 65 connect by links 66 to vertically movable lifting rods or bars 67 which carry at their upper ends the transverse bar 10 already mentioned, to which the feeler plate 8 is connected by a universal joint as already described. The cam 55 is so timed that it lowers the feeler plate 8 just before the carriage reaches its extreme right hand position, Figs. 1, 2 and 3, and as soon as the carriage has started forward sufficiently to permit the pawls 34, 35 to lock the parts in the detected adjustment, the cam 55 releases the detector or feeler plate and permits the spring 68 to lift the feeler plate upward into inoperative position, said plate being normally held by a spring 69 under tendency to tip upward at its right hand or in-going end so as to form a better entrance or mouth for the fresh heel lift when the latter is fed in under said plate. The spring 68 is adjustably secured to the overhanging upper end of the front stationary wall 70 of the magazine. Pivoted by links 71 in parallel ruler fashion adjacent the lower end of this front wall 70 is a gravity plate or separator 72 whose lower end is beveled or forwardly and downwardly inclined at its rear face so as to tend to retain the lower heel lifts in deflected position as shown in Fig. 2, the extreme lower end of said separator hanging normally just above and practically in contact with the transmission block 9 when the latter is in its right hand position as shown in Fig. 2. The separator 72 is so hung, its links 71 being inclined downwardly and forwardly as shown in Fig. 2, that it tends to rise and yet move freely forward when a heel lift is pressed against its rear side by the feeding movement of the carriage, and yet it will drop back into normal position instantly and easily as soon as the heel lift has been fed forward beyond it. The feeding mechanism as herein shown consists of a dog or feeding hook 73 pivoted at 74 in a recess in the rear end of the carriage top 19 and normally impelled upward by a spring 75. The table 7 is cut away and beveled at 76, Fig. 2, for convenience of movement. The table 7 is also cut away or provided with a relatively large aperture at 77, see Fig. 3, and beneath the magazine is provided with two thin bottom plates 78 to support and form a bottom for the stack of leather pieces to rest upon, said plate 78 being separated to provide a track or guiding slot 79 for the feed hook or work projector 73 to travel in and catch the lowermost leather piece of the stack. As it engages the rear end of this lowermost leather piece or heel lift 1, it moves the same forward against the rear beveled end of the gravity member 72, the top 19 moving forward at the same time. The result is that the bottom heel lift of the stack is moved forward from beneath the rest of the stack at the same time that the preceding heel lift 1 on the block 9 is moved forward to the cutting mechanism. This movement of said bottom heel lift is sufficient in extent to carry it beyond the pointed lower end of the gravity member or separator 72 and as soon as it has moved entirely beyond or to the left of said separator, the latter falls back with somewhat of a pounding action against the rest of the stack and thereby holds them in the position shown in Fig. 2 while it is getting into such a position that when the carriage comes back again on its return movement, the rear end of the lift or leather piece 1, then on the rearwardly moving table 19, strikes against the pointed end of the separator, which thereupon holds said lift stationary while the carriage continues to move rearwardly to the right, Fig. 2, and by this means the said heel lift is held in position until it drops off from the table 19 on to the block 9 and is positioned as it appears in Fig. 2. Immediately in front or to the left, Fig. 2, of the feeler mechanism is a fluted feed roll 80 journaled in the free ends of yielding supports 81 held yieldingly downward by springs 82 on bolts 83 provided with tension nuts 84. The supports 81 are provided at their forward or left ends with longitudinal pivots 85 journaled in blocks 86 which themselves have transverse pivots 87 in ears 88 on the frame of the machine so as to permit the feed roll 80 to move independently at its opposite ends in accordance with the requirements of the uneven stock. The feed roll is positively driven by a sprocket chain 89 and pinions 90 and 91 from the drive shaft 52. The knife 92 is adjustably mounted on a heavy cross beam or bar 93 as herein shown, and its cutting edge projects slightly under the feed roll 80 with its beveled edge approximately in line with the lower feeding side of said roll. Thus, as the stock is moved forward by its supporting block 9 its front edge is first engaged by the feed roll 80 which thereafter coöperates with the block 9 in positively feeding the stock or leather piece forward in cutting relation to the cutting knife 92. In this arrangement of a single-bevel knife, in which the leather piece is supported flat upon the block or plate 9, it is necessary to have the bevel such that there is a slight clearance between it and the leather back from the cutting edge in order that the leather shall not pinch or wedge against the heel or rear portion of the beveled surface, i. e. the beveled face or surface should, of course, not incline downwardly rearwardly from the cutting edge, as this would cause a wedging and dragging action on the leather, and, in view of the fact that the cutting action of the leather wears away the metal next to the edge, especially at first, I prefer to provide a slight clearance. This clearance is shown exaggerated in Fig. 2, and as nearly correct in Fig. 1 as is possible in a drawing of the character of a patent drawing. The angle, or obliquity of mounting the knife 92 is such with relation to the leather and to the roll 80 as to insure a proper clearance for the free escape of the skiving. If this clearance were not provided, the skiving would wedge against the roll 80 just above the cutting edge of the knife and thereby tend to lift the roll 80. This would result in gouging and improper skiving. It is essential that the direction of feed of the leather piece at the cutting point shall remain correct and unvarying in order to prevent gouging, and this unchangeable direction of feed is secured here by maintaining the leather piece flat on the block or plate 9 by an unremitting pressure of the roll 80 at a point as close to the cutting edge of the knife as possible without interfering with the proper cutting and escape of the leather which is shaved off. The excursion of the carriage is sufficient to move the forward edge of the work supporting block 9 approximately flush with the end of the frame at 94 and as it reaches this position an ejector or removing finger 95 is moved upward, over, and downward to the right, Fig. 2, behind the piece of leather which has just come out from under the knife 92 and knife block 93, and as the carriage begins to move back to the right this finger 95 moves forward to the left with the piece of leather, a projecting apron 96 being provided on the front end of the block 9 to support the leather piece during the moment it is thus being moved by the finger 95 and before it has been shoved far enough to the left to drop into the open end of a distributing conveyer 97 which at that moment is immediately beneath the free end of said apron 96. An inclined deflecting table 98 is provided to guard against accidental misplacement of the leather piece. The rear lip of the conveyer preferably projects as shown at 99 to insure the proper reception and positioning of the leather piece. The lower end of the conveyer is open so that the normal position of a leather piece in the conveyer is as indicated in Fig. 2, with its lower end resting or sliding on a wear plate 100 which is provided on the upper side of a long arm 101. This arm extends laterally such a distance as the size and grading of the leather pieces require and is provided with a series of compartments. These compartments are numbered according to the system of "irons" commonly in vogue in shoe factories, as 5, 8, 9, 10, 11 and 12. The finger 95 already mentioned is yieldingly supported and, as a convenient means, I have shown the arm 102 as broken or made in two parts, pivoted together at 103, the part 104 on which the finger 95 is mounted being held down by a spring 105 to operate in a loop 106 carried by the free upper end of the other part of the arm. Said arm is pivoted at 107 and operated by a rod 108 pivoted at 109 to a lever 110 mounted to swing on a stationary bracket 111 in position to be engaged by a roll 112 on the inner side of gear 91, see Figs. 1 and 3. The weight of the moving parts is ordinarily sufficient to hold the lever 110 in position to be engaged by the roll 112, but I have also indicated a spring 113, Fig. 7, for this purpose. While many different mechanisms may be provided for controlling the delivery of the different grades (*i. e.* thicknesses) of leather pieces, so that each grade shall be delivered into its right compartment, I have preferred to illustrate the machine in its complete embodiment as provided with an electrically controlled distributer. Referring to Figs. 1, 3, 4, 9–12, it will be seen that I have provided the shaft 31 (which moves with the carriage) with a selector or projection 114 which responds to the grading movement of the gaging mechanism, or mechanism which responds to the feeler-foot movements, and therefore occupies a position corresponding to the grade detected for any given piece of stock. In the path of this selector are a plurality of reciprocating devices corresponding to the successive grades of the leather pieces, eight of these reciprocating devices being herein shown as 115, 116, 117, 118, 119, 120, 121, and 122. The last mentioned is shown as provided with a wing or angular extension in order to show the capacity of my invention for bunching a given number of grades in one box or compartment, if desired. Each of these reciprocating devices is provided with a spring 123 to hold it normally forward and a bail-like detent 124 is held yieldingly by a spring 125 in locking engagement with notches 126, 127 of the reciprocating devices. As any given reciprocating device is pushed back by the engagement therewith of the selector finger 114 as the carriage moves forward, the bail detent 124 permits this movement on account of the shape of the notches 126, 127, Fig. 6, and the said device engages with its contact spring 128, there being provided a contact spring for each device so as to close a circuit through its given circuit wire 129 and contact plate 130, traveling locking mechanism 131, battery 132, and ground 133. The contact plates 130 are on an insulated bar 134 supported on a bracket 135 and leg 136, Fig. 9, of the distributing table 101, and are in position to be engaged by a spring brush 137 yieldingly held on a bracket 138 of the traveling locking mechanism 131. The latter is best shown in Figs. 9–12 where it will be seen that it depends from a carrier 139 arranged to slide on a rectangular guide bar 140 which is pivoted at its opposite ends in the frame of the distributer table 101. The bar 140 has a series of notches 141 to be engaged by a locking detent 142 of the locking traveler 131, said detent being pivoted at 143 and having its left hand end, Figs. 9–11, arranged to constitute an armature 144 to be actuated by the solenoid 145 of the traveler when any one of the circuits is closed as aforesaid. Preferably a slight capacity for yielding is provided between the carrier 139 and the traveler 131, and in fact I have provided more or less yielding in connection with all the distributing movements. Accordingly, the solenoid, locking detent, and brush are mounted on a top plate 146 having sliding movement in a dove-tail way 147 in the carrier, and held forward therein by a spring 148. The carrier itself is normally held under tendency to move to the right, Figs. 9 and 10, by a weight 149 whose cord 150 connects to the carrier at 151, a spring 152 being interposed to ease the shock of sudden stopping. The carrier is moved in an opposite direction by a cord 153 which connects to the carrier at 154, and likewise has an easing spring 155 interposed therein. This cord passes to an oscillating wheel 156 whose shaft 157 is connected by gears 158, 159, shaft 160, and pinion 161, Fig. 7, to be driven by a rack bar 162 reciprocated by a link 163 actuated by the wrist pin 48, already described as operated by the wheel 49. This same rack bar is used to operate the mechanism which trips the distributing conveyer 97 so as to deposit its heel lifts in properly stacked position when it has arrived at its proper compartment (the stack or column in this case being horizontal, however). The overhanging head of an arm 164, see Fig. 1, is in the path of the rack bar so that when the rack bar is raised it hits this arm and slides it upward, said arm having connected to its lower end a bell crank 165 which actuates a connecting rod 166 pivoted at 167 to a crank 168 fast on the left hand end of the rectangular bar 140, Fig. 9. The movement of the crank 168 therefore rocks the bar 140 which correspondingly swings the conveyer 97, said conveyer being pivoted at 169 on the free end of an arm 170 extending rigidly upward from the carrier 139. In the path of the upstanding left hand wall of the conveyer, as viewed in Figs. 1 and 2, is a stationary rod 171, and as the conveyer is swung by the rocking of the bar 140 in the direction of the arrow, Fig. 2, and strikes against this rod, the conveyer is caused to turn on its pivots 169 so as to throw the lower end of the conveyer outward to the left, Fig. 2, and thereby discharge the piece of leather 1 in such a position that it falls flat against those pieces which have been previously discharged. This rocking of the bar 140 takes place at the end of the outward shifting movement of the conveyer, so that the leather piece is therefore discharged into its right compartment. In order that the contact brush 137 shall not drag along on the contact plates 130 as the conveyer is moved back again to receive another heel lift, I interpose a small stop in the form of a lever 172, see Figs. 1 and 3, normally held by a spring 173 so as to spring into place above the free end of an arm 174 when the bar 140 is rocked, and therefore when the rocking impulse ceases and the arm 174 tends to swing back again to its original position, it is prevented from swinging entirely back by this stop 172, a spring 175 being preferably provided to aid in the backward swing of the arm 174. When the conveyer is carried back to its starting point by its carriage, the latter strikes the adjacent end of the lever 172 and knocks it from stopping relation with the arm 174 so that the latter and its rocking bar 140 are again restored to normal position.

In Figs. 15–18 I have shown a modified form of distributer in which the reciprocating devices are the same, excepting that each device is elongated and provided with a notch 176, see Figs. 16 and 17, which loosely holds the short end of a lever 177, there being one of these levers for each reciprocating device, and all of said levers being pivoted at 178 and normally held, as shown in Fig. 16, by springs 179, and provided at their outer ends with notches or a detent construction 180 in position to engage contact studs or projections 181 properly spaced and located on a hub 182, whose lower reduced end 183 is journaled in the outer end of a bracket 184 of the machine. Said hub is normally rotated in one direction by a pinion 185 loosely mounted on the upper reduced end thereof, a tooth 186 depending from said pinion in engagement normally with an opposite tooth or projection 187 on said hub, a spring 188 normally tending to hold said parts 186, 187 together and to rotate said hub as permitted by said pinion, but permitting the hub to stop whenever a detent 180 engages a contact stud 181. The pinion 185 is driven by a rack bar 189 which slides in a stationary guide 190, and is actuated by a lever 191 and a cam roll 192 traveling in a cam path 193 driven by a gear 194. Fast on the upper reduced end of the hub 182 at the upper side of the pinion 185 is the hub of a conveyer arm 195 which carries at its free end the conveyer which distributes the heel lifts. This conveyer is herein shown as comprising a pair of jaws 196, 197, pivoted together at 198, and preferably having a slightly flaring mouth, as shown in Fig. 18. These jaws are held by a spring 199 under tendency to close onto the heel lift which is indicated at *m* in Fig. 18. The lower jaw 197 is stationary and permanently secured to the arm 195 and the upper jaw is operated by a rigid finger 200 which engages said jaw between two pins 201, 202. The finger 200 is fast on a rod 203 arranged to reciprocate vertically in the hollow pinion 185 and hub 182, as best shown in Fig. 15, and is operated by a lever 204 which extends to the left, Fig. 15, from a rock shaft 205 which is rocked by a lever 206 whose cam roll 207 travels in a cam path 208 in the same cam which carries the cam path 193, already mentioned. The movement of the lever 204 is so timed as to open said conveyer jaws whenever the conveyer is approaching the feed apron 96 to get a heel lift which has been evened, and also whenever the conveyer has reached the proper bin or compartment and has been halted by the selector mechanism. In order to hold the heel lift in position to be received properly by said jaws as the apron 96 is moving away from beneath said heel lift, I provide a latch-like engaging device 209, see Figs. 16 and 18, fast on a shaft 210 free to turn by the gravity of said engaging device, a hub of said shaft carrying a finger 211 to prevent said engaging device from swinging down too far when the apron 96 moves from beneath the same.

In Figs. 13 and 14 I have shown a still further modification of my distributing invention, these figures showing the reciprocating form of distributer, very much the same as in the species as described, excepting that instead of being electrically controlled, its control is entirely mechanical. Instead of having the reciprocating devices 115—122 as previously described, I provide a single arm 212, having a series of shoulders 213 set at different distances from a given position of the selector finger 114, so that when the latter engages any one of said notches, it moves the arm 212 a corresponding distance, said arm being locked in the position to which it is thus moved by a locking detent or dog 214 which engages the teeth 215 of a tail piece which extends to the right, Fig. 14, from said arm 212. Extending from said arm in the opposite direction is a rack bar 216 which engages a toothed sector or wheel 217 on the end of a rocking shaft 218 provided with a series of pins or stops 219 which perform the same office as the stops 181, being staggered at the required distances along the shaft 218 so as to move into the path of a finger 220 on the carriage 139, already described, and thereby stop the conveyer 97 opposite the right compartment the same as before, excepting that in this case it is done mechanically instead of electrically. The rack bar 216 is normally held under tendency to move toward the right, Fig. 14, by a spring 221, and the dog 214 has an inclined end 222 by which it is tripped by a tripping pawl 223 held against swinging by a stop 224 when the work carriage is moving to the left, Fig. 14, but free to swing idle when said carriage is moving back to the right.

The operation of my machine may be very briefly described, as I have already described it in detail in connection with the explanation of the mechanical construction of the machine. The operator places a column of heel lifts 1 in the magazine 2, as shown in Fig. 2, and as the work carrier moves forward, the feeding hook 73 catches hold of the rear end of the lowermost heel lift and carries it along with it on the top 19. As the work table moves back again, this heel lift strikes against the lower end of the separator 72, which halts it, and causes it to assume a proper position on the transmission block 9, the separator meanwhile jogging the stack of lifts into proper position for the next feeding movement. As soon as the fed heel lift 1 has assumed its proper position on the transmission block or plate 9, the feeler-foot or plate 8 is brought forcibly down upon said lift, its central actuating bar 10 being moved downward always to one and the same position. As, however, said feeler plate is capable of tipping universally to any angle, the result is that it assumes the position of the top surface or peripheral top-edge of the leather piece beneath it and hence tips at such an angle as the relative thickness and thinness of said leather piece at its edges may require. The result is that the lowermost edge or corner, as the case may be, of the feeler plate, i. e., that portion of the feeler plate which has succeeded in detecting the thinnest edge-portion of the leather piece, determines the adjustment or transmission movement of the transmission plate 9, forcing the latter downward to the extent required by this thin edge spot of the leather piece. As the plate 9 thus moves down, it correspondingly actuates the setting wheel or locking member 32 through the intermediate parts 16, 26, 27, 29 and 30, and the moment that the carriage starts forward with the leather piece whose thickness has thus been grade-detected, the locking wheel 32 is locked by one or the other of the pawls 34, 35 instantly moved by their springs 44, 45 when permitted by the disengagement of the tail piece 46 from the stop 47, thus holding the leather piece rigidly as it is moved beneath the evening knife 92. As soon as the transmission plate 9 has been locked, the feeler plate 8 releases its pressure, and as soon as the front edge of the leather piece arrives beneath the roll 80, the latter coöperates with the forwardly moving block 9 in positively feeding the leather piece beneath the knife 92, this construction, as already pointed out, permitting the proper skiving or cutting of the leather piece to its desired reduced or evened thickness by means of a knife having a single bevel, without any danger of gouging the leather piece. This is because the body of the stock as it is fed against the edge of said knife is maintained substantially flat and the knife is set at an angle or in an oblique plane so as to wedge off the skiving with just the wedging action required for even cutting. The knife 92 is set under the feed roll 80 as close to the bight as possible while still leaving sufficient clearance for the free escape of the skiving without tendency from the latter to lift the feed roll, and hence the feed roll (the tension being correct) can apply its pressure directly downward on the body of the heel-lift so as to maintain the latter flat against the plate 9 without liability to raise under the action of the knife, and the latter has its beveled surface as nearly level with the skived surface of the leather as is practicable, i. e., there is only sufficient clearance or inclination to avoid the dragging tendency on the leather such as would be present if there were much frictional resistance. Instead of having two feed rolls, I prefer the moving plate 9 in place of the under roll, as it prevents the pinching of the front edge of the heel-lift and facilitates keeping the leather flat and preventing it from rising. The latter is the main object or secret of success in this arrangement of a single-bevel knife. The leather piece having been evened, is finally caught by the ejector or removing finger 95 which pulls it along the then retreating apron 96 into the conveyer or hopper-like distributing box 97, and the latter instantly shifts laterally to that compartment which is to receive the lifts of that particular thickness and is there instantly stopped by the locking pawl 142 which is caused to engage the proper notch 141 by the closing of the circuit through the coöperation of the particular reciprocating device 115—122 which has been actuated by the selector finger 114, it being remembered that said selector finger has been turned to the exact elevation required by the same shaft 31 which carries the locking wheel 32 which has already been set and locked in accordance with the determination of the feeler mechanism. As soon as the conveyer 97 has reached its proper compartment and has been halted as described, the rocking bar 140 is rocked so as to hit the upper end of said conveyer against the rod 171 and thereby tip or swing the lower end of the conveyer to the left, Fig. 2, and thereby throw the leather piece into properly stacked relation with the previously delivered leather pieces in said compartment. The conveyer 97 is thereupon instantly returned to receive the next leather piece which has meanwhile been deposited in proper position beneath the feeler plate and has had its thinnest edge-portion detected, the transmission plate 9 having been correspondingly gaged and set and said piece fed forward and evened, all as previously described for the preceding piece.

I have intended herein to use the same terms as in my preceding patents, the feeler mechanism or detector apparatus being that mechanism which ascertains the thin spot in the leather piece, and the grading mechanism being that mechanism which engages or responds to the leather piece so as to usefully perpetuate the determinations of the feeler means or detecting mechanism. In the present instance, the specific form of this leather engaging means does not mark the leather piece, for the reasons already explained, but performs two offices, the first of which consists of evening the leather piece (an office which has been accomplished in certain of my preceding machines), and the other of which consists of distributing the leather pieces which have been thus evened. Certain of the claims, however, which are limited to novel features herein, which are capable of use with any of the grading means heretofore recognized (whether by marking, visually indicating to the eye of the operator but without marking, cutting or evening, or distributing), are intended to be claimed in combination with such grading means broadly, so as to cover the novel feature in connection with any of the different varieties of grading means. According to my present invention, I have succeeded in greatly simplifying the detecting mechanism, so that it is brought down practically to a single piece or device, and is broadly claimed in this respect. In thus emphasizing this feature, I do not intend to limit myself in this respect in certain of my other claims. My invention is also broadly new in providing, in connection with an automatic evening mechanism means for distributing the leather pieces thus evened. Likewise it is of a pioneer character in respect to providing an automatic feed of the leather pieces in connection with edge grading, so that the machine feeds one piece after another from a general source of supply, and then they are automatically edge graded (irrespective of the manner in which they are graded, i. e., whether they are evened, distributed, or graded in any other way). Likewise, I wish to point out that my invention is broadly new in providing a stack feed in connection with feeler mechanism and cutting or evening mechanism. So, also, it is new in providing feeler mechanism or thickness determining means in connection with evening and distributing mechanism. In thus attempting to point out certain of those features of my invention which I regard as of basic novelty and importance, I do not wish to be understood as attempting to point out all of the important features, as there are various other features also of marked importance, as will be apparent from the following claims. My invention is accordingly further described and defined in the form of claims, as follows:

1. A machine of the kind described, comprising evening mechanism for determining the respective thicknesses to which successive died-out pieces of uneven leather should be cut in order to be even respectively, said mechanism including cutting mechanism automatically adjustable to the successive pieces in accordance with said determination for cutting off the thicker portions of the pieces of varying thickness, combined with distributing mechanism responsive to said evening mechanism for distributing the evened pieces in accordance with the thickness as determined by said evening mechanism.

2. In a machine of the kind described, the combination of automatically adjustable mechanism for cutting away the unevennesses from one surface of uneven-died-out pieces of leather and distributing mechanism coördinated and connected therewith to distribute said evened pieces in accordance with the respective adjustments of said cutting mechanism and the resulting thicknesses to which the respective pieces are cut.

3. A machine of the kind described, comprising feeler mechanism for determining the thin spot among a plurality of spots of varying thicknesses in a leather piece to be cut, cutting mechanism, means related to said feeler mechanism for setting said cutting mechanism in accordance with said determination of the feeler mechanism, and distributing mechanism for distributing successive pieces of stock from said cutting mechanism in accordance with said determinations of said feeler mechanism.

4. A machine of the kind described, comprising stack-feeding mechanism for supporting a series of died-out pieces of leather stacked on each other and feeding said pieces one at a time from said stack, combined with feeler mechanism for determining a thin spot among a plurality of spots of varying thicknesses in said pieces of leather, evening mechanism for reducing said leather pieces to the desired grade or thickness, and mechanism for adjusting said evening mechanism to even the leather pieces in accordance with the feeler-determinations.

5. A machine of the kind described, comprising stack-feeding mechanism for supporting a series of died-out pieces of leather stacked on each other and feeding said pieces one at a time from said stack, combined with feeler mechanism for determining a thin spot among a plurality of spots of varying thicknesses in said pieces of leather, evening mechanism for reducing said leather pieces to the desired grade or thickness, and grade indicating means responsive to said feeler mechanism for grading said leather pieces according to their relative thicknesses as determined by said feeler mechanism.

6. A machine of the kind described, comprising mechanism for holding a plurality of died-out pieces of leather of uneven thickness in position to be fed, automatic feeding mechanism for feeding said pieces one at a time, and mechanism for determining the grade of each piece with reference to the thin portions at its edge.

7. A machine of the kind described, comprising feeler mechanism for determining the thin spot among a plurality of spots of varying thicknesses in each of a plurality of leather pieces, said feeler mechanism including a unitary stock engaging device for detecting said thin spot among said plurality of spots in each piece and a transmission device which is itself responsive to said unitary detecting device for all the detections which are to be transmitted from said detecting device in detecting said plurality of leather pieces, and grading mechanism governed by said single transmission device for grading said pieces.

8. In a machine of the kind described, feeler mechanism for determining the thinnest spot among a plurality of spots of varying thicknesses throughout a given area of a leather piece while said piece is held stationary in the machine, said mechanism comprising a single feeler device for engaging said leather piece at said plurality of spots while so held stationary, and grading mechanism for grading said leather pieces according to the determinations of said feeler mechanism.

9. In a machine of the kind described, a magazine for holding a series of leather pieces in a stack, each of which is uneven in thickness and is to be graded, feeding mechanism for feeding the leather pieces, means for detecting the thin spot among the plurality of spots of varying thicknesses of each piece as it is fed, and grading mechanism responsive to said detecting mechanism for grading said leather pieces according to said thin spots so detected.

10. In a machine of the kind described, adjustable mechanism for cutting away the unevennesses from one surface of uneven died-out pieces of leather, said mechanism including feeding mechanism having a part for engaging the piece of leather being cut and supporting the body of said leather substantially flat during the cutting operation and a single-bevel knife set in a plane oblique to said supporting part, and means for controlling the adjustment of said adjustable mechanism in accordance with the thin spot among a plurality of spots of varying thickness in each leather piece, said adjustable mechanism being responsive in its adjustment to the said thin spot so as to bring the thin spot of the leather piece to be cut just level with the cutting edge of said knife.

11. In a machine of the kind described, adjustable mechanism for cutting away the unevennesses from one surface of uneven died-out pieces of leather, said mechanism including feeding mechanism having a part for engaging the piece of leather being cut and supporting the body of said leather substantially flat during the cutting operation and a single-bevel knife set in a plane oblique to said supporting part, with the bevel side of the knife positioned next to the body of the leather piece and the back or flat side of the knife positioned to engage and wedge away or deflect the skiving and means for controlling the adjustment of said adjustable mechanism in accordance with the thin spot among a plurality of spots of varying thickness in each leather piece, said adjustable mechanism being responsive in its adjustment to the said thin spot so as to bring the thin spot of the leather piece to be cut just level with the cutting edge of said knife.

12. In a machine of the kind described, feeler mechanism for determining the thinnest spot among a plurality of spots of varying thicknesses throughout a given area of a leather piece while said piece is held stationary in the machine, including an upper and a lower plate to grasp the leather piece flat between them, one of which plates is movable toward the other plate to press the leather piece against the latter during the feeling operation, and grading means for thereafter grading the leather piece in accordance with the determinations of said feeler mechanism.

13. In a machine of the kind described, feeler mechanism for determining the thinnest spot among a plurality of spots of varying thickness throughout a given area of a leather piece while said piece is held stationary in the machine, including an upper and a lower plate to grasp the leather piece flat between them, one of which plates is movable toward the other plate to press the leather piece against the latter during the feeling operation, a knife for evening the leather piece to the thickness determined by said feeler mechanism, and a feed roll between said knife and one of said plates for aiding the feeding of the leather piece.

14. In a machine of the kind described, feeler mechanism for determining the thinnest spot among a plurality of spots of varying thickness throughout a given area of a leather piece while said piece is held stationary in the machine, including an upper and a lower plate to grasp the leather piece flat between them, one of which plates is movable toward the other plate to press the leather piece against the latter during the feeling operation, a knife for evening the leather piece to the thickness determined by said feeler mechanism, and a feed roll between said knife and one of said plates for engaging the piece of leather on the side which is to be cut by said knife and aiding the feeding of the leather piece during the cutting operation.

15. In a machine of the kind described, feeler mechanism for determining the thinnest spot among a plurality of spots of varying thicknesses throughout a given area of a leather piece while said piece is held stationary in the machine, including an upper and a lower plate to grasp the leather piece flat between them, one of which plates is movable toward the other plate to press the leather piece against the latter during the feeling operation, cutting mechanism for evening the leather piece to the grade ascertained by the feeler mechanism, and means for moving said latter plate after the feeling operation to facilitate the presentation of the leather piece to said cutting mechanism.

16. In a machine of the kind described, feeler mechanism for determining the thinnest spot among a plurality of spots of varying thicknesses throughout a given area of a leather piece while said piece is held stationary in the machine, including an upper and a lower plate to grasp the leather piece flat between them, one of which plates is movable toward the other plate to press the leather piece against the latter during the feeling operation, said movable plate also having a movement out of parallelism with the other plate in accordance with the varying thickness of different portions of the leather piece clamped between the two plates, and grading means for thereafter grading the leather piece in accordance with the determinations of said feeler mechanism.

17. In a machine of the kind described, a feeler plate for engaging one side of an uneven leather piece which is to be evened, said feeler plate having a bodily movement toward the leather piece and a tipping movement to accommodate itself to the surface of the leather piece with which it contacts, a cutter for evening the leather piece to the grade determined by said feeler plate, and mechanism coöperating with said feeler plate and said cutter for regulating the cutting of the leather piece to said grade, including a device for holding the leather piece at the required distance from the cutter during the cutting operation, and means for thus setting said holding device.

18. In a machine of the kind described, feeler mechanism, including two plates for grasping the leather piece between them whose thickness is to be determined, one of said plates being hollowed out in its central area to present peripheral engaging edges and being bodily movable toward the other and being further mounted to have a tipping movement in accordance with the uneven surface of the leather piece, and mechanism for receiving and transmitting the feeler movements of said movable plate.

19. In a machine of the kind described, feeler mechanism for determining the thickness to which a leather piece is to be cut, a stationary cutter, and means for feeding said leather piece beneath said cutter so that the latter will remove a portion of the leather from the upper side of the piece.

20. In a machine of the kind described, feeler mechanism for determining the thickness to which a leather piece is to be cut, a stationary cutter, and means for feeding said leather piece beneath said cutter so that the latter will remove a portion of the leather from the upper side of the piece, said feeding means including a feed roll located relative to the cutter to engage the leather piece on its upper side.

21. In a machine of the kind described, a cutter, means for supporting a piece of leather to be cut thereby with reference to a thin spot of said piece, a feeler for moving said supporting means and the leather piece to a level which brings the desired thin spot of the leather piece just level with said knife, and means for then moving the leather piece and its supporting means into cutting relation with said knife.

22. In a machine of the kind described, feeler mechanism for first determining the grade of a leather piece and evening mechanism to even the piece in accordance with the grade thus determined, combined with distributing mechanism for thereafter classifying said leather piece according to said determined grade, said distributing mechanism including mechanism for delivering the leather piece, and a selector for controlling said delivery in accordance with the grade of the particular leather piece.

23. In a machine of the kind described, grade determining mechanism for determining the thin spot among a plurality of spots of varying thickness in each of a plurality of uneven leather pieces and evening mechanism to even the piece in accordance with the grade thus determined, combined with distributing mechanism for thereafter classifying said leather pieces according to their thus determined grades, said distributing mechanism including delivering means under control from said grade determining means.

24. In a machine of the kind described, feeler mechanism for determining the grade of a leather piece, combined with distributing mechanism for classifying said leather piece according to its grade, said distributing mechanism including mechanism for delivering the leather piece, a plurality of stop devices for controlling said delivering mechanism for different grades of leather pieces, and a single selector governed by said feeler mechanism for selecting the device required for the grade of the particular leather piece.

25. In a machine of the kind described, feeler mechanism for determining the grade of a leather piece, combined with distributing mechanism for classifying said leather piece according to its grade, said distributing mechanism including mechanism for delivering the leather piece, a plurality of compartments or stations for receiving leather pieces of corresponding different grades, a series of stops one for each compartment, and selective mechanism responsive to said feeler mechanism for bringing the delivering mechanism and the required stop into coöperation to deliver a given leather piece in the proper compartment according to its grade.

26. In a machine of the kind described, feeler mechanism for determining the different grades of successive leather pieces of varying thicknesses, combined with distributing mechanism for separating the leather pieces into their different grades in response to said feeler mechanism, including a reciprocating conveyer for receiving the leather pieces one at a time and delivering them to different stations, and automatic mechanism for causing the conveyer to deliver its load at the proper station.

27. In a machine of the kind described, feeler mechanism for determining the different grades of successive leather pieces of varying thicknesses, and evening mechanism to even said pieces in accordance with the grades thus determined, combined with distributing mechanism responsive to said feeler mechanism for thereafter separating the leather pieces into their said different grades, including a conveyer for delivering the leather pieces according to their aforesaid grades, and means for moving the leather piece from the feeler mechanism to the conveyer.

28. In a machine of the kind described, feeler mechanism for determining the different grades with reference to the thinnest spot in each of successive leather pieces of varying thicknesses, combined with distributing mechanism responsive to said feeler mechanism for separating the leather pieces into their different grades in response to said feeler mechanism, including mechanism to deliver said leather pieces in stacked relation to each other.

29. In a machine of the kind described, means for supporting a series of leather pieces in an upright stack in position to be graded, said means having a movable gravity front-wall mounted to yield with a forward and upward movement when required for the escape of a leather piece being fed, said wall then tending to fall back against the remainder of the stack to aid in keeping them in proper position, and means for then receiving the leather piece fed, including feeler mechanism for determining the grade of the leather piece.

30. In a machine of the kind described, means for supporting a series of leather pieces in an upright stack in position to be graded, said means having a movable gravity front-wall mounted to yield with a forward and upward movement when required for the escape of a leather piece being fed, said wall then tending to fall back against the remainder of the stack to aid in keeping them in proper position, means for then receiving the leather piece fed, including feeler mechanism for determining the grade of the leather piece, and means responsive to said feeler mechanism for grading the leather pieces according to said determinations.

31. In a machine of the kind described, means for supporting a plurality of leather pieces in an upright series one above the other, reciprocating feeding mechanism for removing said leather pieces one at a time and feeding them forward, feeler mechanism for receiving said leather pieces as said feeding mechanism moves back again and determining their grade, and grading mechanism for classifying said leather pieces according to the grade thus determined.

32. In a machine of the kind described, means for supporting a plurality of leather pieces in an upright series one above the other, reciprocating feeding mechanism for removing said leather pieces one at a time and feeding them forward, feeler mechanism for receiving said leather pieces as said feeding mechanism moves back again and determining their grade, and cutting mechanism for evening said leather pieces according to their grade thus determined.

33. In a machine of the kind described, means for supporting a plurality of leather pieces in an upright series one above the other, reciprocating feeding mechanism for removing said leather pieces one at a time and feeding them forward, feeler mechanism for receiving said leather pieces as said feeding mechanism moves back again and determining their grade, and distributing mechanism for distributing the leather pieces in accordance with their different grades thus determined.

34. The combination with a single-bevel knife mounted obliquely to the plane of feed and cut of the leather piece, of feeding mechanism containing a part for engaging and supporting the body of said leather piece substantially flat during the cutting operation, said knife having its bevel side positioned next to the body of the leather piece and its back or flat side positioned to engage and wedge away or deflect the skiving and a feed roll mounted close to the cutting edge of the knife.

35. The combination with a single-bevel knife mounted obliquely to the plane of feed and cut of the leather piece, of feeding mechanism including feeding devices for engaging the leather piece on its opposite sides, the device on one side moving with relation to the leather piece, and the device on the other side moving with the leather piece.

36. The combination with a single-bevel knife mounted obliquely to the plane of feed and cut of the leather piece, of feeding means for maintaining the leather piece flat as it is being cut, including mechanism movable with relation to the leather piece for preventing the bending or deflection of the body of the leather piece at its point of engagement with said knife.

37. The combination with a single-bevel knife mounted obliquely to the plane of feed and cut of the leather piece, of a yielding feed roll mounted close to the cutting edge of the knife for engaging the leather piece on the same side as the knife, and a feed plate for engaging the piece on the opposite side and moving therewith to support and feed the piece while being cut.

38. The combination with a single-bevel knife mounted obliquely to the plane of feed and cut of the leather piece, of feeding mechanism including relatively yielding feeding devices for engaging the leather piece on both sides, one of said devices having engagement with the leather piece in front of the knife before the front edge of the leather piece engages the knife, and the other of said devices having engagement with the leather piece at the extreme front edge of the latter while the leather piece is being engaged and cut by said knife.

39. The combination with a single-bevel knife mounted obliquely to the plane of feed and cut of the leather piece, of feeding mechanism, including a plate for engaging the leather piece on one side to aid in moving the leather piece during the cutting operation, said plate having free movement parallel to the cutting plane but no movement at that time transversely to said plane, and a rotary feed roll mounted under yielding tension to hold the leather piece hard pressed against said plate during said cutting operation.

40. A machine of the class described having, in combination, mechanism for splitting and sorting a series of blanks, and automatic means controlled by the thickness of each blank presented to the machine for controlling the operation of said mechanism.

41. A machine of the class described, having in combination, mechanism for splitting and sorting a series of blanks, and automatic means controlled by a thin spot of each blank presented to the machine for governing the splitting and sorting of said blanks.

42. A machine of the class described having, in combination, mechanism for splitting and sorting a series of blanks, and automatic means operated by each blank during its passage through the machine for sorting and splitting said blank in accordance with its thickness.

43. A machine of the class described, having in combination, mechanism for splitting and sorting a series of blanks, and automatic means operated by each blank during its passage through the machine for sorting and splitting said blanks with reference to their thickness-grades.

44. A machine of the class described, having, in combination, splitting means for splitting a series of blanks to different thicknesses, automatic means operated by each blank to govern the thickness to which it shall be split, and distributing mechanism arranged to coöperate with said splitting means to distribute the split blanks with reference to the thickness to which they have been split.

45. A machine of the class described, having, in combination, grade determining mechanism for determining the thickness to which a blank shall be split, splitting means, and sorting mechanism for receiving the successive blanks in accordance with the thickness thus determined and to which they have been split.

46. A machine of the class described, having, in combination, splitting mechanism for splitting successive blanks to different thicknesses, and automatic distributing mechanism responsive to the varying thicknesses of the split blanks for sorting said split blanks in accordance with their thickness-grades.

47. A machine of the class described, having, in combination, grade determining mechanism for determining the thickness to which a blank shall be split, an automatic feed for feeding successive blanks to said mechanism, splitting means, and sorting mechanism for receiving the successive blanks in accordance with the thickness thus determined and to which they have been split.

In testimony whereof, I have signed my name to this specification, in the presence of two subscribing witnesses.

ELMER P. NICHOLS.

Witnesses:
GEO. H. MAXWELL,
JAMES R. HODDER.